US006172865B1

(12) United States Patent
Boy et al.

(10) Patent No.: US 6,172,865 B1
(45) Date of Patent: Jan. 9, 2001

(54) MODULE FOR PROTECTING TELECOMMUNICATION DEVICES AGAINST VOLTAGE SURGES

(75) Inventors: Juergen Boy; Winfried Völkner; Norbert Krost, all of Berlin (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/314,735

(22) Filed: May 18, 1999

(30) Foreign Application Priority Data

May 18, 1998 (DE) .......... 198 23 446

(51) Int. Cl.[7] .......... H02H 1/00
(52) U.S. Cl. .......... 361/119
(58) Field of Search .......... 361/119, 120, 361/115, 103, 124, 91.1, 56, 57

(56) References Cited

U.S. PATENT DOCUMENTS

| | | |
|---|---|---|
| 4,321,649 | 3/1982 | Gilberts . |
| 4,901,188 | 2/1990 | Gilberts . |
| 5,142,434 | 8/1992 | Boy et al. . |
| 5,241,446 | 8/1993 | Cosley et al. . |
| 5,272,280 | 12/1993 | Cosley et al. . |
| 5,383,085 | 1/1995 | Boy et al. . |
| 5,388,023 | 2/1995 | Boy et al. . |
| 5,633,777 | 5/1997 | Boy et al. . |

FOREIGN PATENT DOCUMENTS

| | | |
|---|---|---|
| 25 38 919 | 3/1977 | (DE) . |
| 36 21 200 | 1/1988 | (DE) . |
| 38 35 921 | 4/1990 | (DE) . |
| 41 11 682 | 11/1992 | (DE) . |
| 43 31 215 | 3/1994 | (DE) . |
| 93 16 664 | 3/1994 | (DE) . |
| 43 18 366 | 10/1994 | (DE) . |
| 43 26 596 | 2/1995 | (DE) . |
| 44 44 515 | 4/1996 | (DE) . |

*Primary Examiner*—Josie Ballato
*Assistant Examiner*—Robert Deberadinis
(74) *Attorney, Agent, or Firm*—Kenyon & Kenyon

(57) ABSTRACT

A module is provided which includes two gas-filled surge arresters arranged next to one another in a housing. An auxiliary discharge gap and a short-circuit device is associated with each surge arrester. One side of each surge arrester is in contact with a plate, which forms the ground, as well as the stationary electrode of the short-circuit device. On the other side, the plate is in contact with two varistors which form the auxiliary discharge gaps. A cap, forming the movable electrode of the spring-loaded short-circuit device is placed on each varistor with a meltable spacer between them.

3 Claims, 2 Drawing Sheets

MODULE FOR PROTECTING TELECOMMUNICATION DEVICES AGAINST VOLTAGE SURGES

FIELD OF THE INVENTION

The present invention relates to surge protection for telecommunication devices and is to be used in designing modules having two gas-filled surge arresters arranged in an insulating housing, with each surge arrester having an auxiliary discharge gap and a short-circuit device responding in the event of an overload.

BACKGROUND INFORMATION

In a conventional module of this type (see FIG. 1) sold in the U.S. market, both surge arresters, each of which has two electrodes and is surrounded by a metallic sleeve 1 forming the corresponding auxiliary gap, are arranged next to each other in the chambers of an insulating housing 2. One electrode of each surge arrester is in contact with one plug-in contact part 3 leading outside from housing 2, while the other electrode is connected to the metallic cover 6 of insulating housing 2 via a low-melting spacer 4 and a helical leaf spring 5. This cover is used as ground and has a terminal contact leading to the outside. In this conventional module, the auxiliary spark gap of each surge arrester has an air spark gap connected in parallel, which is implemented using a perforated insulating foil (vent-safe characteristic, see U.S. Pat. No. 5,142,434). The surge arrester and the air spark gap are arranged in metallic sleeve 1. In the conventional module this metallic sleeve 1 and spacer 4 are also arranged in a cup 7, whose edge is kept at a certain distance $x_1$ from plug-in contact part 3. In the event of an overload, spacer 4 melts, and, under the effect of leaf spring 5, the edge of cup 7 comes into contact with contact part 3 (fail-safe characteristic).

The vent-safe characteristic can be implemented using a metal oxide varistor protected against the effect of moisture instead of an air gap using a moisture-sensitive insulating foil. This metal oxide varistor is designed as a hollow cylinder, provided with metal-plated end faces and placed on the first electrode of the arrester (see, for example, U.S. Pat. No. 5,383,085/German Patent No. 43 31 125 A1). A similar method has also been used in three-electrode arresters (see, for example, U.S. Pat. No. 5,388,023/U.S. Pat. No. 5,633,777), where a cylindrical varistor and a meltable spacer are placed on one of the two end electrodes and secured there using an elastic clip attached to the central electrode and a cap arranged at the end of the elastic clip. The edge of the cap and the respective end electrode, i.e., a contact ring placed on the end electrode, form the two electrodes of a short-circuit device (fail-safe characteristic).

SUMMARY

An object of the present invention is to form the auxiliary gaps using metal oxide varistors and thus to simplify and make cost-effective the design of the module as a whole.

The following measures are provided to achieve this object: The common contact device has a plate whose one side is in direct contact with the second electrode of the two surge arresters. Furthermore, each of the two auxiliary discharge gaps is formed by a varistor provided with two contact surfaces, one contact surface of each of the two varistors being in direct contact with the other side of the plate. Additionally, the plate forms the counter-electrode of the two short-circuit devices and the movable electrode of each short-circuit device has a cap placed on the other contact surface of one varistor with the meltable spacer positioned between them. To make the overall structure of the module complete, each cap is electrically connected to the first electrode of the respective surge arrester via an elastic clip securing the cap.

With such a design of the module, the auxiliary functions "short-circuit" and "overload protection" assigned to the respective surge arrester are arranged constructively separately from the surge arrester and implemented together in a submodule, which is connected to the electrodes of the surge arrester via two simple contact elements. This ensures that the individual components of the module can be assigned to one another by simple assembly steps.

DETAILED DESCRIPTION

Figure 2:
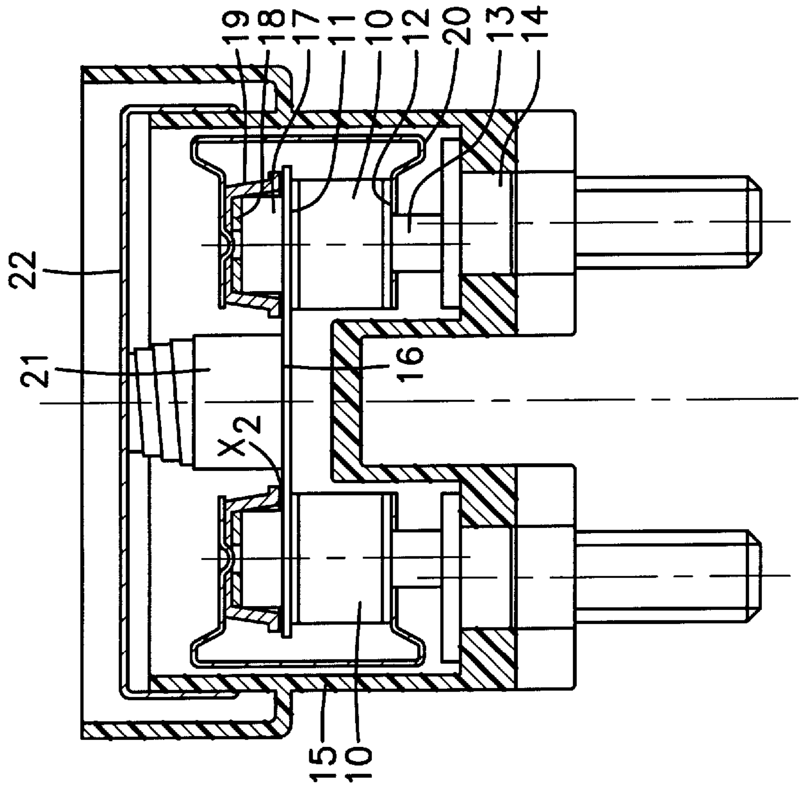
FIG. 2 shows a module according to an example embodiment of the present invention using the previously customary housing.
Figure 1:
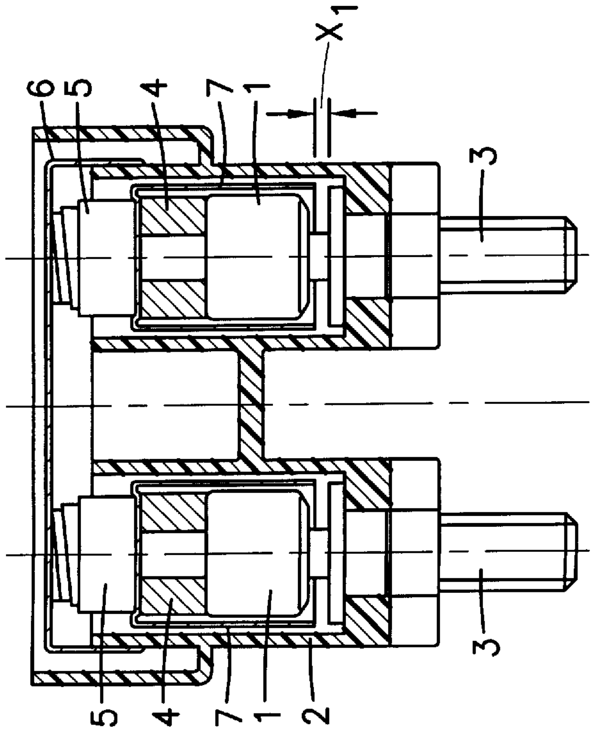
FIG. 1 shows a conventional module.

As illustrated in FIG. 2, two gas-filled surge arresters 10, each having a first end electrode 12 and a second end electrode 11, are arranged in two adjacent chambers of the insulating housing 15. First end electrode 12 is provided with a contact piece 13, in contact with plug-in contact part 14.

A metal plate 16, connected to metal cover 22 of the housing via a helical leaf spring 21, is placed on second end electrode 11 of the two surge arresters 10. Metal plate 16, leaf spring 21 and cover 22, which is provided with a terminal contact that is not illustrated, represent the common contact device for the two surge arresters 10.

A varistor 17, a meltable spacer 18 and a metal cap 19 are placed on the top of plate 16 coaxially to the two surge arresters 10. Varistor 17, spacer 18 and cap 19 are attached using an elastic clip 20, whose one end is in contact with first electrode 12. This elastic clip, which is made of a spring-elastic material such as copper—beryllium, conducts the potential of first electrode 12 to cap 19 and thus also to varistor 17 via spacer 18 made of a low-melting solder.

Cap 19 is provided with a circumferential rim, which is held at a distance ($X_2$) from plate 16 by spacer 18.

Varistors 17 are electrically dimensioned, as described in, for example, U.S. Pat. No. 5,833,085 at column 2, lines 25 through 36 or column 4, lines 3 through 16.

Figure 4:
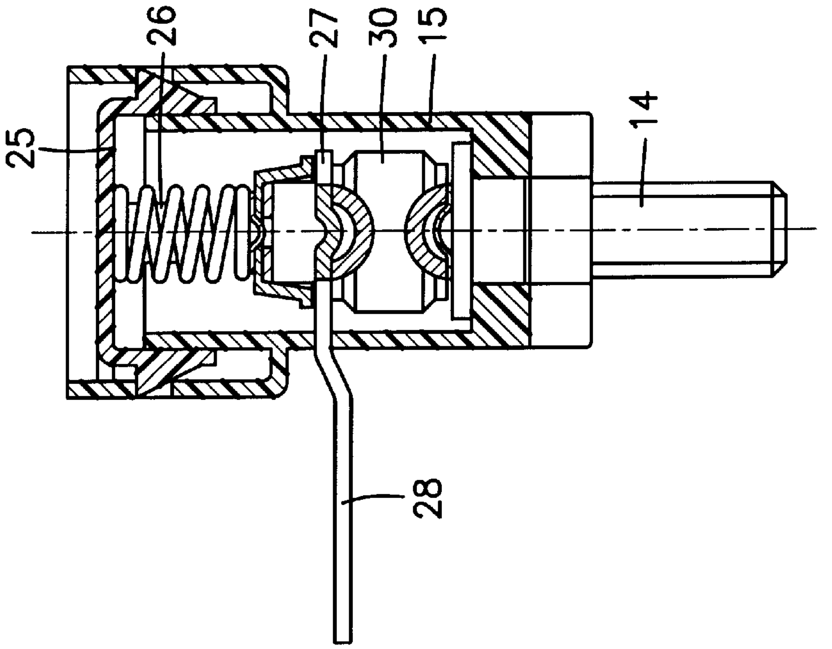
FIGS. 3 and 4 show a module with a modified method of securing the short-circuit device using an insulating housing cover, according to an example embodiment of the present invention.
Figure 3:
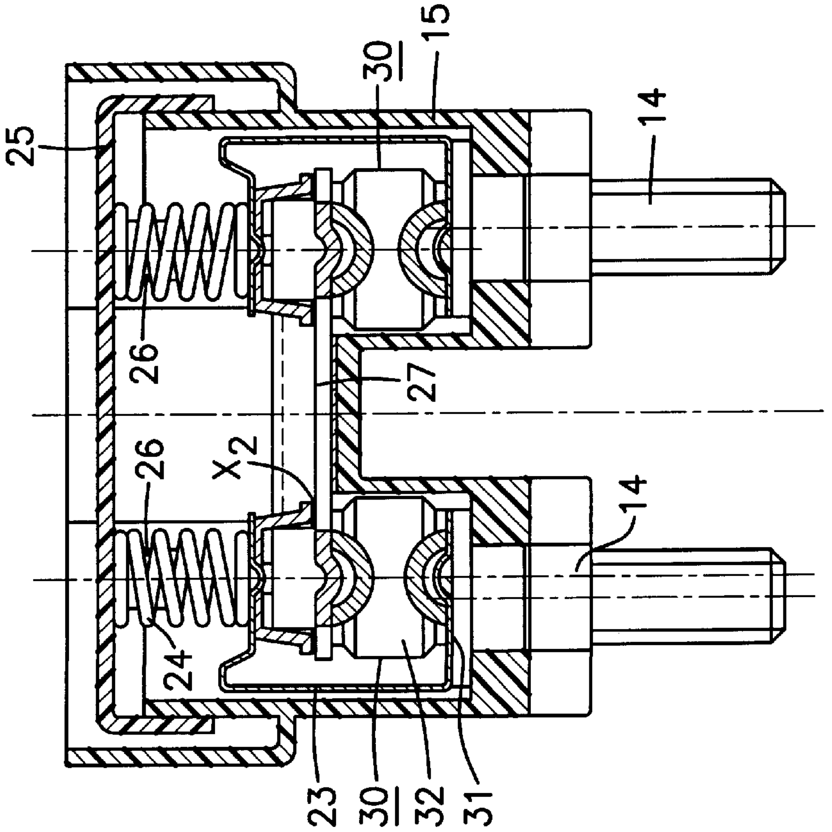

In the module of FIGS. 3 and 4, not only housing 15, but also cover 25 is made of an insulating material, so that cover 25 only has a mechanical function. For this purpose, the cover is provided with two knobs 26, on which helical springs 24 are placed. The other ends of these compression springs are in contact with a leg of clip 23 and press knob 19, spacer 18, varistor 17, metal plate 27, and the two surge arresters 30 against one another, thus securing them within housing 15. Surge arresters 30 are designed so that lower electrode 31 has no contact pin, but is in contact with the respective plug-in contact part 14 with the other leg of clip 23, made of copper, for example, between them. Furthermore, the insulator 32 of each surge arrester is provided with a bezel, so that the outer diameter of the insulator is greater than the outer diameter of the two electrodes. Thus, safety distances can be observed to avoid undesirable contacts.

In the example embodiment shown in FIGS. 3 and 4, plate 27 alone forms the common contact device of both surge arresters 30 and is provided with a terminal contact 28 leading to the outside through the wall of the insulating housing.

What is claimed is:

1. A module for protecting telecommunication devices against voltage surges, comprising:

an insulated housing provided with a cover;

two gas-filled surge arresters arranged next to one another in the insulating housing, each of the surge arresters having a first electrode and a second electrode;

a respective auxiliary discharge gap connected in parallel to each of the surge arresters, each respective auxiliary discharge gap including a respective varistor having two contact surfaces;

a respective short-circuit device assigned to each of the surge arresters, each respective short-circuit device responding in an event of an overload, each respective short-circuit device having an axially movable electrode and a counter electrode, the movable electrode including a respective cap and being held at a distance from the counterelectrode by a meltable spacer, and a plug-in contact part leading to an outside of the housing, the plug-in contact part being associated with the first electrode of each of the surge arresters;

a common contact device leading to the outside of the housing, the common contact device including a plate, the plate forming the counterelectrode of both of the short-circuit devices, a first side of the plate being directly contacted by the second electrode of both of the surge arresters, a first one of the contact surfaces of each respective varistor being in direct contact with a second side of the plate, the respective cap and the meltable spacer of each respective short-circuit device being placed on a second one of the contact surfaces of the respective varistor, the meltable spacer of each respective short-circuit device being positioned between the respective cap of the respective short-circuit device and the second one of the contact surfaces of the respective varistor; and an elastic,clip, each cap being electrically connected to the first electrode of the respective surge arrester via the elastic clip, the elastic clip securing each cap.

2. The module according to claim 1, wherein the cover is metallic, and wherein the plate is acted upon by a spring which electrically connects the plate with the cover.

3. The module according to claim 1, wherein the cover is formed for an insulating material, and wherein the plate forms the common contact device and is acted upon by two helical springs, the helical springs being supported by the cover of the housing and by the cap of each respective short-circuit device.

* * * * *